United States Patent [19]

Davies

[11] Patent Number: 4,814,788

[45] Date of Patent: Mar. 21, 1989

[54] MULTI-JET INK JET PRINTER

[75] Inventor: Gwilym R. Davies, Warrington, England

[73] Assignee: Imperial Chemical Industries PLC, London, England

[21] Appl. No.: 66,338

[22] Filed: Jun. 23, 1987

[30] Foreign Application Priority Data

Jul. 14, 1986 [GB] United Kingdom ................ 8617123

[51] Int. Cl.[4] ......................... G01D 15/18; B05B 5/00

[52] U.S. Cl. ...................................... 346/75; 239/690; 361/228

[58] Field of Search .......................... 346/75; 361/228; 239/690; 427/26

[56] References Cited

U.S. PATENT DOCUMENTS

| | | | |
|---|---|---|---|
| 3,735,925 | 5/1973 | Benedek et al. | 239/704 |
| 4,549,243 | 10/1985 | Owen et al. | 361/228 |
| 4,636,808 | 1/1987 | Herron | 346/75 |

*Primary Examiner*—E. A. Goldberg
*Assistant Examiner*—Gerald E. Preston
*Attorney, Agent, or Firm*—Cushman, Darby & Cushman

[57] ABSTRACT

A multiple print head for a continuous ink jet printer has its individual ink jets produced by an electrostatic field as an array of cusps along a straight edge to which the ink is continuously supplied. The straight edge is produced by folding an electrically conductive foil to give a surface less prone to corona discharges.

6 Claims, 2 Drawing Sheets

MULTI-JET INK JET PRINTER

Figure 1:
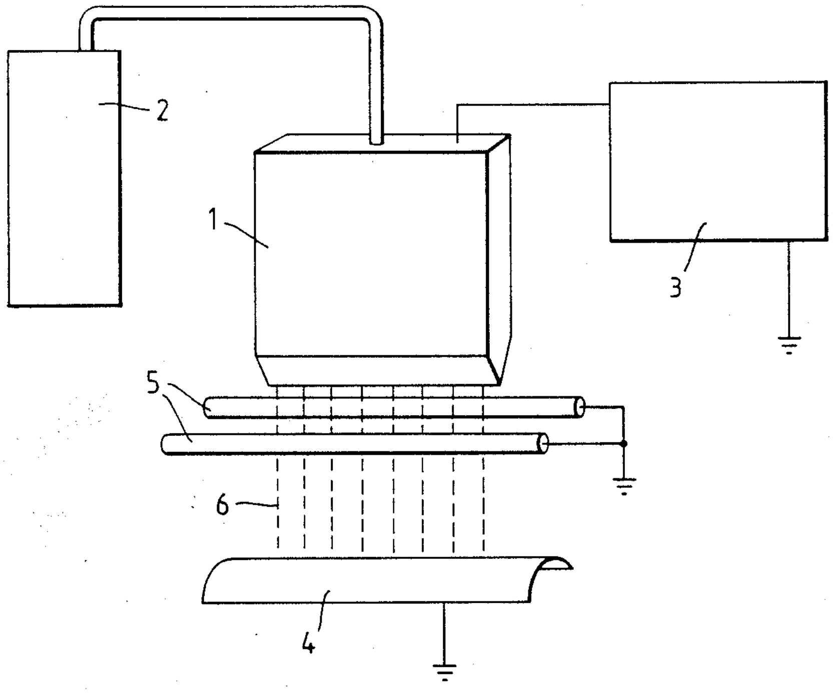

The invention relates to ink jet printers producing a plurality of continuous ink jets.

Apparatus has been developed over many years for direct printing onto receptor surfaces by emitting jets of ink drops from a print head under the control of information-carrying signals, to produce a record of the information (including both alpha numeric and graphical information) on the receptor surface. Such printers have developed mainly into two kinds, these being generally referred to as "continuous ink jet" and "drop on demand" printers respectively.

In continuous ink jet printers, the jets are emitted continuously, and selected ink drops are deflected from the stream of moving drops forming each jet, using a deflector responsive to the information-carrying signals. Printing can be effected by directing either the the deflected or the undeflected drops towards the receptor surface, depending on the design of the particular printer being used. The remainder of the ink drops are generally caught, filtered and recycled. To enable the whole width of a page to be printed simultaneously, a multi-jet print head may be used having an array of such nozzles, each producing a continuous ink jet deflected independently of the others. The receptor surface can then be moved in a direction orthogonal to the array of nozzles in order to progress the printing along the receptor surface.

In our copending European application No. 86 300168.1 (subsequently published as EP-A-No. 188346) we describe an ink jet printer having a print head for emitting a plurality of continuous ink jets each comprising a stream of moving charged ink drops which are deflected electrostatically in response to information-carrying signals. In order to overcome problems associated with the blocking of the small individual nozzles of earlier printers, ink is supplied continuously to a slot or elongated edge portion of an electrically conducting body while a strong electrostatic field is applied to draw off the ink as an array of parallel cusps. However, although we had felt it should be desirable to make any such edge portion as sharp as possible to concentrate the field, we found in practice that when we machined the edge portions to only moderately sharp edges, e.g. with radii of about 50 μm or less, we tended to be troubled by corona discharges, depending on ink flow rates and electrostatic field needed. We also noticed that at times we had uneven spacing between the jets.

We have now devised a print head having an elongated edge portion of a different structure from the solid machined edge portion we had previously used, and we have found that not only is such a construction relatively easy to manufacture, but that there appears to be less tendency to produce corona discharges when using this new structure and the uneveness of cusp spacing referred to above seems less prevailent.

Accordingly, one aspect of the present invention provides an ink jet printer having a print head for emitting a plurality of continuous ink jets each comprising a stream of moving charged ink drops, and means for deflecting selected drops or groups of drops from each stream in response to information-carrying signals whereby a receptor surface can be placed to receive the deflected or undeflected drops to provide a record of the information, characterised in that the print head comprises (i) a foil of electrically conductive material folded along an axis to form a straight edge along the fold, the foil thereby having an inner surface and an outer surface as defined by its position with respect to the fold, (ii) ink supply means disposed for continuously feeding ink to the outer surface of the foil such that it flows uniformly towards at least an elongated portion of the straight edge, and (iii) means electrically connected to the foil for providing along the edge portion an electrostatic field sufficient to draw off the ink continuously as an array of parallel cusps extending away from the edge portion thereby to provide one of the said continuous ink jets from each cusp.

The foil thus provides an outer surface onto which ink can be continuously supplied and caused to flow towards the straight edge portion. The foil is electrically connected to a suitable source of electrical potential thereby to provide one of the electrodes for producing the field, and a second electrode (a target electrode) at a different (e.g. earth) potential is placed parallel to but spaced apart from the straight edge portion of the head so as to provide the electrostatic field between the head and the target electrode, in known manner. Field adjusting electrodes may also be placed close to the foil so as to enhance the field, again in known manner. As the ink flows over the outer surface of the foil towards the fold it becomes charged by the field, and as it reaches the edge portion where the field is concentrated by the sharpness of the fold, the ink is drawn off towards the target electrode as an array of cusps. The cusps will then break up into a stream of drops which can be deflected onto or away from a receptor sheet as described above.

We find that in folding a foil, we can readily obtain a uniform edge, giving uniform distribution of the field along the edge and uniform release properties for the ink. We find we can achieve such benefits very simply and without requiring precision machining equipment, and accordingly as a further aspect of the present invention we provide a method for manufacturing a print head for a continuous ink jet printer, comprising (i) folding a foil of electrically conductive material along an axis to form a straight edge along the fold, the foil thereby having an inner surface and an outer surface as defined by its position with respect to the fold, (ii) mounting the foil on a supporting member with its inner surface adjacent to said member, (iii) disposing an ink supply means for continuously feeding ink to the outer surface of the foil such that it flows uniformly towards at least an elongated portion of the straight edge, and electrically connecting to the foil means for providing along the edge portion an electrostatic field sufficient to draw off the ink continuously as an array of parallel cusps extending away from the edge portion thereby to provide one of the said continuous ink jets from each cusp.

A preferred head is one in which the foil is folded through an angle of at least 90° and preferably through an angle of 180° so that the portions of the foil either side of the fold are parallel. We further prefer that the inner surfaces the these foil portions are touching each other as they extend way from the fold. The thickness of the edge portion is then determined mainly by the thickness of the foil, preferred foil thickness being within the range 15 to 75 μm, giving a corresponding edge thickness ranging approximately from 30 to 150 μm. With some folding operations a more rounded fold may be produced, e.g. by the foil being wrapped round a former or otherwise left with a hollow region immediately behind the fold. The inner surfaces may then continue in parallel but spaced apart planes, or converge until they touch and then extend further away from the field in a mutually adjacent and touching relationship. With such more rounded folds we prefer to use thinner foils such that the thickness of the edge portion remains less than 150 μm.

When the foil is folded through an angle less than 180°, the sharpness of the edge portion is less easy to define, but in general we prefer the fold to be as sharp as possible consistant with there being no break down of the structure of the foil's outer surface. Radii of curvature less than 75 μm are again preferred where possible.

Figure 2A:
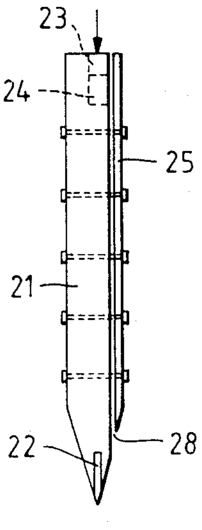
Figure 2B:
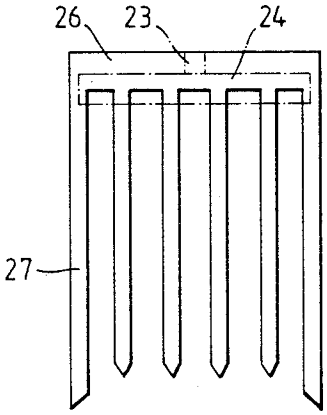
Figure 3:
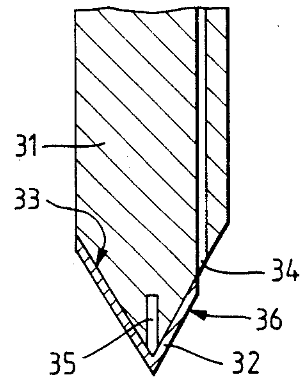

The invention is illustrated by reference to specific print heads and parts therefor shown in the accompanying drawings, in which FIG. 1 is a general block diagram of the testing rig in which various print head constructions were tested, FIGS. 2_a_ and 2_b_ show parts which assemble to form one of our earlier prototype designs of print head, now used as supporting members for constructions according to the present invention, FIG. 3 shows a foil folded through about 120° and mounted on the supporting members of FIG. 2, and FIG. 4 a preferred foil folded through 180° this being the shape tested in the results shown hereinafter.

The apparatus shown in FIG. 1 comprises a print head 1 and a liquid feed metered pump 2 connected to supply ink, or other liquid used in the tests, to the print head 1. A high voltage generator 3 is connected to the print head and to earth. Opposite the print head is positioned an earthed target electrode 4, and on either side of the print head is mounted an earthed field-adjusting electrode 5, parallel to the print head. Over the target electrode can be passed paper or other absorbent for the ink, or the liquid can be allowed to run to waste in this test rig. The print head is shown under test with a few of the streams of liquid drops 6 shown. This rig was built to test print heads and the formation of stable ink jets, and does not have any of the drop deflecting means used in the full printer.

FIGS. 2_a_ and 2_b_ show our earlier prototype print head, which was in fact a development of those described in our earlier specification referred to above. FIG. 2_a_ shows an insulated body member 21, which was tapered along its lower edge and had a brass electrode 22 inset along the apex of that tapered edge. At the upper end, a liquid inlet port 23 for receiving liquid from the metering pump 2, led into a transverse reservoir 24 formed in one side of the body member. Bolted to the same side was a cover plate 25, separated from the body member by a gasket 26 illustrated in FIG. 2(_b_). This gasket was comb-shaped, with its fingers 27 extending across the reservoir towards the tapered end of the head, and holding open a slot 28 about 100 μm wide between the cover plate and the body member. Thus liquid fed to the reservoir would spread across the width of the head, then feed down between the fingers of the comb until it emerged through the slot as an even sheet of fluid flowing out onto the tapered surface at the lower end of the head.

To evaluate the present invention, foils folded as described above were fitted over the tapered end, and the new print head so formed was assembled onto the test rig shown in FIG. 1, with the electrode 22 connected to the high voltage generator 3, and liquid fed through the slot onto ther outer surface of the foil. This assembly is shown in FIG. 3, where the earlier print head 31 provides a supporting member for a foil 32 folded through about 120°, and covering one of the tapered surfaces 33 of the print head but extending only as far as the slot 34 in the other. The inner surface of the foil contacts the electrode 35, and the liquid issuing from the slot flows down the outer surface 36 of the foil.

Figure 4:
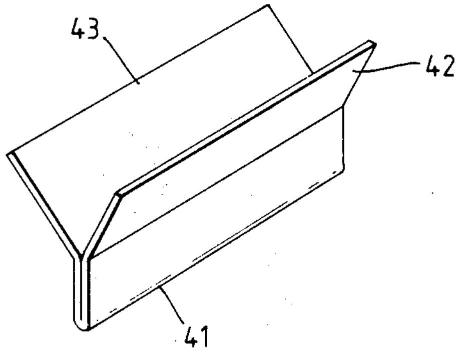

FIG. 4 shows our preferred foil configuration, the foil having been folded through 180°, then remote from the fold 41 the free ends 42, 43 of the foil have been bent back through about 30° so as to match the taper of the support member 31.

In a series of experiments, three thickness of ductile copper foil were used: 17.5 μm, 35 μm and 70 μm. The sheets were all folded by hand for these experiments. Each was first folded through 90° around a sharp edge, then hand rolled to 180° using a rod parallel to the fold, until the two inner surfaces thus formed were pressed close together. Two lines were scribed on the outer surfaces parallel to the fold, and the free ends opened out to match the angle of the supporting member shown in FIG. 2, on which the folded foil was then mounted to provide a spray head according to the present invention. The spray heads thus formed were assembled in turn on the rig shown in FIG. 1, and various high voltages applied. Fluid was fed to the reservoir and so caused to flow out through the gap and over the outer surface of the foil down to the fold. The fluid used was a mixture of light oil and cyclohexanone, having a resistivity of $2 \times 10_8$ ohm cm. Different spacings of the auxiliary electrodes, different voltages and different flow rates were applied, and the spacing between the individual ligaments of liquid formed along the fold by the applied field, was measured. The results were as follows:

| fold length cm | foil thickness μm | edge potential KV | aux. electrodes distance cm. apart | aux. electrodes distance cm. below fold | flow rate ml/min | ligament spacing μm |
|---|---|---|---|---|---|---|
| 10 | 35 | 19.5 | 1.8 | 1.0 | 2.5 | 320 |
| 0 | 35 | 18.7 | 1.8 | 0.2 | 2.5 | 300 |
| 10 | 17.5 | 15.0 | 1.8 | 0.2 | 0.6 | 290 |
| 10 | 17.5 | 11.9 | 1.0 | 0.2 | 0.6 | 240 |
| 5 | 35 | 12.0 | 1.0 | 0.2 | 0.6 | 290 |

At these voltage levels, with the earlier design using a machined brass electrode, i.e. as above without the foil, corona discharge can be observed. With the foil cap in place according to the present invention, no discharging occured. The ligaments appeared to be evenly spaced.

These values do not indicate the closest ligament spacing obtainable by this method. Closer ligment spacing, e.g. of 200 μm can be achieved by using higher resistivity fluids, and 100 μm spacing would likewise appear to be possible from the results attained, although such close spacing did not occur during these tests.

I claim:

1. An ink jet printer having a print head for emitting a plurality of continuous ink jets each comprising a stream of moving charged ink drops, and means for deflecting selected drops or groups of drops from each stream in response to information-carrying signals whereby a receptor surface can be placed to receive the deflected or undeflected drops to provide a record of the information, characterised in that the print head comprises (i) a foil of electrically conductive material folded along an axis to form a straight edge along the fold, the foil thereby having an inner surface and an outer surface as defined by its position with respect to the fold, (ii) ink supply means disposed for continuously feeding ink to the outer surface of the foil such that it flows uniformly towards at least an elongated portion of the straight edge, and (iii) means electrically connected to the foil for providing along the edge portion an electrostatic field sufficient to draw off the ink continuously as an array of parallel cusps extending away from the edge portion thereby to provide one of the said continuous ink jets from each cusp.

2. A printer as claimed in claim 1, in which the foil is folded through an angle of at least 90°.

3. A printer as claimed in claim 2 in which the foil is folded through an angle of 180° so that the portions of the foil either side of the fold are parallel.

4. A printer as claimed in claim 3, in which inner surfaces of such foil portions are touching each other as they extend away from the fold.

5. A printer as claimed in any one of the preceding claims in which the straight edge has an external radius of curvature less than 75 μm.

6. Electrostatic spraying apparatus comprising a spray head for emitting a plurality of continuous jets of a liquid which each comprise a stream of moving charged liquid drops, characterized in that the spray head comprises (I) a foil of electrically conductive material folded along an axis to form a straight edge along the fold, the foil thereby having an inner surface and an outer surface as defined by its position with respect to the fold, (II) liquid supply means disposed for continuously feeding ink to the outer surface of the foil such that it flows uniformly towards at least an elongated portion of the straight edge, and (III) means electrically connected to the foil for providing along the edge portion an electrostatic field sufficient to draw off the liquid continuously as as array of parallel cusps extending away from the edge portion thereby to provide one of the said continuous jets from each cusp.

* * * * *